United States Patent
Scholand et al.

(10) Patent No.: US 9,338,751 B2
(45) Date of Patent: May 10, 2016

(54) METHOD AND DEVICE FOR CONTROLLING A TRANSMIT POWER IN A USER EQUIPMENT

(71) Applicants: Tobias Scholand, Muelheim (DE); Michael Speth, Krefeld (DE); Majid Boloorian, Allentown, PA (US); Cheng Yi, Marlboro, NJ (US); Sanjeev Tavathia, Breinigsville, PA (US); Biljana Badic, Duesseldorf (DE); Rajarajan Balraj, Duesseldorf (DE)

(72) Inventors: Tobias Scholand, Muelheim (DE); Michael Speth, Krefeld (DE); Majid Boloorian, Allentown, PA (US); Cheng Yi, Marlboro, NJ (US); Sanjeev Tavathia, Breinigsville, PA (US); Biljana Badic, Duesseldorf (DE); Rajarajan Balraj, Duesseldorf (DE)

(73) Assignee: Intel Deutschland GmbH, Neubiberg (DE)

( * ) Notice: Subject to any disclaimer, the term of this patent is extended or adjusted under 35 U.S.C. 154(b) by 484 days.

(21) Appl. No.: 13/658,004

(22) Filed: Oct. 23, 2012

(65) Prior Publication Data
US 2014/0113675 A1 Apr. 24, 2014

(51) Int. Cl.
*H04W 52/16* (2009.01)
*H04W 52/42* (2009.01)

(52) U.S. Cl.
CPC .............. *H04W 52/16* (2013.01); *H04W 52/42* (2013.01)

(58) Field of Classification Search
CPC ............ H04W 52/146; H04W 52/367; H04W 52/143; H04W 52/16; H04W 52/42
USPC ......................................................... 455/522
See application file for complete search history.

(56) References Cited

U.S. PATENT DOCUMENTS

| | | | | |
|---|---|---|---|---|
| 7,447,516 | B2 * | 11/2008 | Heo et al. ........................ | 455/522 |
| 8,249,091 | B2 * | 8/2012 | Kim et al. ...................... | 370/432 |
| 2010/0217453 | A1 * | 8/2010 | Itoh ........................... | H02J 3/00 700/295 |
| 2012/0004007 | A1 * | 1/2012 | Zhou et al. ..................... | 455/522 |
| 2012/0196643 | A1 * | 8/2012 | Xiao et al. ..................... | 455/522 |
| 2012/0326505 | A1 * | 12/2012 | Otsuki ....................... | H02J 3/28 307/31 |
| 2013/0313893 | A1 * | 11/2013 | Ichikawa ................. | H02J 17/00 307/9.1 |
| 2015/0084431 | A1 * | 3/2015 | Yeh .......................... | H02J 7/025 307/104 |
| 2015/0224883 | A1 * | 8/2015 | Ichikawa ............ | B60L 11/1842 320/108 |

OTHER PUBLICATIONS

3GPP Specification. 3GPP TS 25.101 Release 11 Section 6.4.1 dated Sep. 2012. 2 Pages.
3GPP Specification. 3GPP TS 25.214 Release 11 Section 5.1.2.6 dated Sep. 2012. 4 Pages.
3GPP Specification. 3GPP TS 25.308 Release 8 Section 18 dated Mar. 2011. 3 Pages.
3GPP Specification. 3 GPP TS 25.319 Release 9 Section 19 dated Jun. 2009. 5 Pages.
* cited by examiner

*Primary Examiner* — Andrew Wendell
*Assistant Examiner* — Maryam Soltanzadeh
(74) *Attorney, Agent, or Firm* — Eschweiler & Associates, LLC

(57) ABSTRACT

A device includes a first adjustment unit which is configured to adjust a power of a first carrier signal, and a second adjustment unit configured to adjust a power of a second carrier signal. The first adjustment unit is configured to adjust the first carrier signal power based on a maximum allowable imbalance between the first carrier signal power and the second carrier signal power. A method for controlling a transmit power in a user equipment of a radio communications system includes calculating in the user equipment first carrier signal power and a second carrier signal power. The method further includes adjusting in the user equipment the calculated transmit power for at least one out of the first carrier signal and the second carrier signal based on the maximum allowable power imbalance between the first carrier signal power and the second carrier signal power.

16 Claims, 5 Drawing Sheets

METHOD AND DEVICE FOR CONTROLLING A TRANSMIT POWER IN A USER EQUIPMENT

FIELD

The invention generally relates to mobile communications. In particular, the invention relates to a method and a device for controlling a transmit power in a radio communications system.

BACKGROUND

During a communication between a user equipment of a radio communications system and a base station, transmission conditions of transmit channels may vary. An uplink transmit power is configured to the transmit channel conditions.

User equipment for use in radio communications systems, components included therein and methods performed by such components constantly have to be improved. In particular, it is desirable to improve the power transmit control. For these and further reasons there is a need for the present invention.

BRIEF DESCRIPTION OF THE DRAWINGS

The accompanying drawings are included to provide further understanding of embodiments and are incorporated in and constitute a part of this description. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
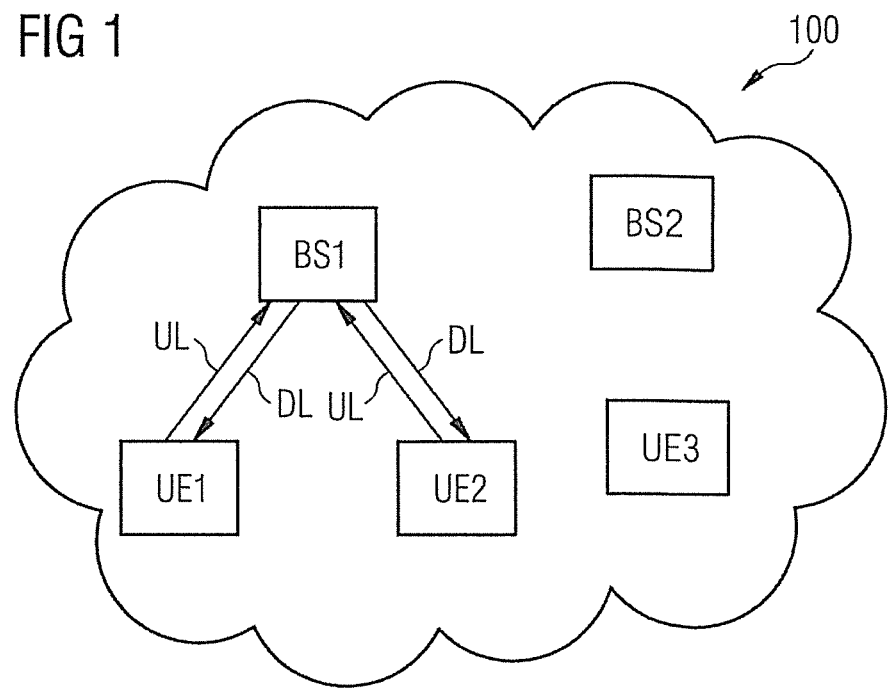
FIG. 1 schematically illustrates a radio communications system.

In the following, embodiments are described with reference to the drawings wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense, and the scope of protection is defined by the appended claims.

The various aspects summarized may be embodied in various forms. The following description shows by way of illustration various combinations and configurations in which the aspects may be practiced. It is understood that the described aspects and/or embodiments are merely examples and that other aspects and/or embodiments may be utilized and structural and functional modifications may be made without departing from the scope of the present disclosure. In addition, while a particular feature or aspect of an embodiment may be disclosed with respect to only one of several implementations, such feature or aspect may be combined with one or more other features or aspects of the other implementations as it may be desired and advantageous for any given or particular application. Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal.

The methods and devices described herein may be used for various wireless communication networks such as Code Division Multiple Access (CDMA), Time Division Multiple Access (TDMA), Frequency Division Multiple Access (FDMA), Orthogonal FDMA (OFDMA) and other networks. The terms "network", "system" and "radio communications system" are often used synonymously. A CDMA network may implement a radio technology such as Universal Terrestrial Radio Access (UTRA), CDMA 2000, etc. UTRA includes wideband-CDMA (W-CDMA) and other CDMA variants. CDMA 2000 covers IS-2000, IS-95 and IS-856 standards. A TDMA network may implement a radio technology such as global system for mobile communications (GSM) and derivatives thereof. The network may be part of Universal Mobile Telecommunication System (UMTS).

In particular, the methods and devices described herein may be based on High Speed Downlink Packed Access (HSDPA) which has been introduced into the release 5 version of the UMTS standards based on W-CDMA multiple access schemes by the "$3^{rd}$ generation partnership project" (3GPP) standardization. HSDPA represents an enhanced 3G mobile radio communications protocol in the high speed packed access family (HSPA). HSDPA allows networks based on UMTS to provide higher data transfer speeds and capacity.

Today's wireless communication systems use multi carrier techniques to increase the data throughput of an individual user and/or to increase the cell capacity using frequency diversity of the mobile radio channel. Such technique using dual carriers (DC) was applied, for example, to the 5 MHz bandwidth frequency division duplex system (3G FDD) for the High Speed Downlink Packed Access (HSDPA) in 3GPP Rel. 8 (25.308 Section 18) and for the High Speed Uplink Packed Access (HSUPA) in 3GPP Rel. 9 (25.319 Section 19) which shall serve as an example in what follows.

For DC-HSUPA, two carriers are adjacent in the frequency domain to allow an optimized RF radio frequency front-end design with respect to power consumption. Actually, instead of having two separate radio frequency front-ends, each having 5 MHz bandwidth, a single radio frequency front-end having 10 MHz bandwidth can be used. Such a single radio frequency front-end includes a single power amplifier that originates an overall transmission power level.

To make use of the frequency diversity of the mobile radio channel, the transmit power level of each DC-HSUPA carrier is adjusted independently. Frequency diversity stays for a different fading on different frequencies in a physical transmission channel.

FIG. 1 shows an exemplary radio communications system 100. This may be a communications system according to a UMTS standard. Moreover, this may be a communications system based on W-CDMA multiple access schemes as introduced by the $3^{rd}$ generation partnership project. FIG. 1 shows two base stations BS1 and BS2. FIG. 1 further shows three user equipments UE1, UE2 and UE3. Communication system 100 may be organized in different layers for which different requirements apply. For example, a media access control layer (MAC) and a physical layer are known to the person skilled in the art. It is further to be understood that the radio communications system 100 may include further components which are not explicitly illustrated for the sake of simplicity. For example, the radio communications system 100 may further include a radio network controller (RNC) and a core network (CN). The RNC may be configured to provide various control functionalities for the base stations BS1 and BS2 while the CN may be configured to provide various services to the user equipments UE1, UE2 and UE3. A user equipment may be a mobile radio transceiver, a hand-held radio device or any similar devices.

A communication between the UE1 and base station BS1 as well as a communication between UE2 and BS1 are indicated by arrows. In a downlink (DL) direction data may be transmitted from the base station BS1 to the user equipments UE1 and UE2 via high speed downlink shared channels (HS-DSCH), a dedicated physical channel (DPCH) or a fractional dedicated physical channel (F-DPCH). In an uplink (UL) direction data may be transmitted from the user equipments UE1 and UE2 to the base station BS1 via a high speed dedicated physical control channel (HS-DCPCH), a dedicated channel (DCH) or an enhanced dedicated channel (E-DCH). The DCH may include a dedicated physical control channel (DPCCH) and optionally a dedicated physical data channel (DPDCH) while the E-DCH may include an enhanced dedicated physical control channel (E-DPCCH) and an enhanced dedicated physical data channel (E-DPDCH). Note that the mentioned uplink and downlink channels are, inter alia, known from the above-mentioned 3GPP standards. It is understood that data may also be transmitted between the user equipment UE1 and the base station BS2 as well as between the user equipments UE2 and UE3 and the base stations BS1 and BS2.

Figure 2:
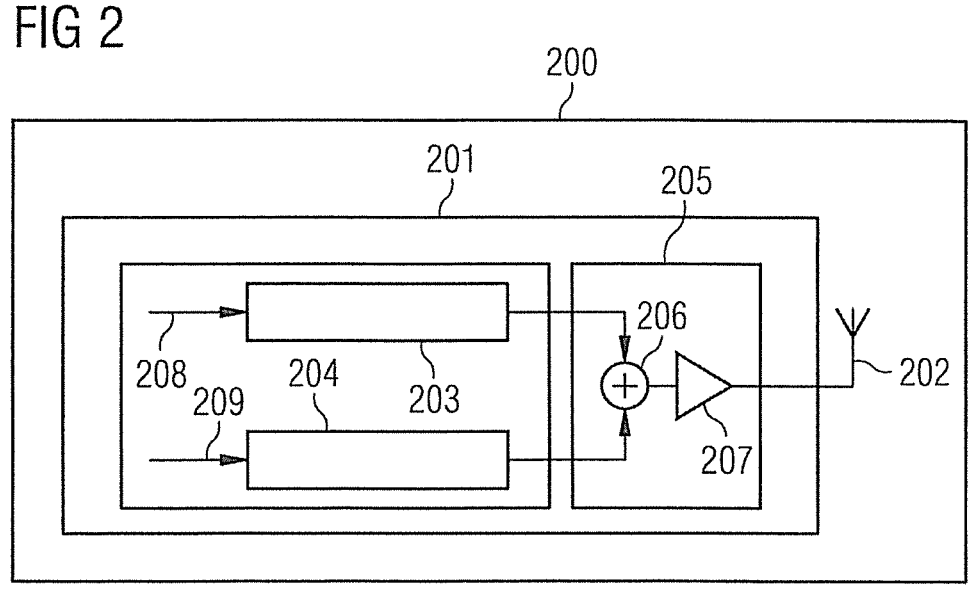
FIG. 2 schematically illustrates a user equipment 200 comprising two adjustment units.

The uplink channels UL depicted in FIG. 1 may be configured to use the DC-HSUPA with two carrier frequencies. An exemplary user equipment 200 configured to use the DC-HSUPA with two carrier frequencies is shown in FIG. 2. A first carrier signal may have a bandwidth of about 5 MHz. Other bandwidth values are possible. This may be, for example, 7.5 MHz or 10 MHz or any other value. A second carrier signal may have a bandwidth of the same value than the first carrier signal, i.e. 5 MHz or 7.5 MHz or 10 MHz or any other value. The bandwidth of the two carrier frequencies may be as well different. The frequency bands of the first carrier signal and the second carrier signal may be adjacent to each other.

User equipment 200 comprises a power controller 201 and an antenna 202. The power controller 201 is a device for controlling a transmit power and comprises a first adjustment unit 203 configured to adjust a power of a first carrier signal and a second adjustment unit 204 configured to adjust a power of a second carrier signal. The power controller 201 further comprises a radio frequency front-end 205. The radio frequency front-end 205 comprises an adder 206 in which the first carrier signal and the second carrier signal are added. The radio frequency front-end 205 further comprises a power amplifier 207 which receives at an input the combined first and second frequency carrier signals and which outputs an amplified radio signal to antenna 202. The power amplifier 207 may have a bandwidth equal to the bandwidths of the added carrier signals. If the bandwidth of the first carrier signal and the second carrier signal are 5 MHz each, then the power amplifier 207 has at least a bandwidth of 10 MHz if the two frequency bands of the carrier signals are adjacent. The frequency bands of the two carrier signals may also be spaced from one another. However, the two frequency bands of the carrier signals and the bandwidth of the power amplifier 207 are configured to each other in such a way that the two frequency bands fall within the bandwidth of the power amplifier. Antenna 202 transmits the signal via an uplink channel UL.

First adjustment unit 203 and second adjustment unit 204 are separate units. First adjustment unit 203 adjusts the power for the first carrier dependent on a channel attenuation at the first carrier frequency. Second adjustment unit 204 adapts the power for the second carrier dependent on a channel attenuation at the frequency of the second carrier. First adjustment unit 203 receives an input 208 comprising information of a power setting. Adjustment unit 204 receives information at an input 209 concerning a power setting for the second carrier. Information signals 208 and 209 come from the network and/or from the later discussed media access controller.

The independent power adjustment takes into account frequency diversity but may lead to a power imbalance. A transmit power imbalance of an uplink channel is defined as the magnitude of the difference between the transmit power levels of both uplink frequencies. A power imbalance will have to be supported by the radio frequency front-end 205. With 3GPP requirements, as given in Standard 25.101 Sect. 6.2 and 6.4, the radio frequency front-end would have to support a power imbalance of up to 74 dBm for typical class 3 devices. If there is an important carrier power imbalance, the carrier having a lower power level will be disturbed by the other carrier having a higher power level by so-called "in-band emissions".

If a power imbalance is not taken into account, the base station will receive a signal with a bad signal-to-noise ratio due to in-band emissions and set the carrier power higher. Although this may resolve the problem for the present user equipment, it is not a good solution for the communications system. The user equipment will send with higher power than necessitated by the channel attenuation and may thus disturb other user equipments. The overall power in the network or the communications system is then increased. By taking care not to exceed a maximum allowable power imbalance, in-band emission is avoided. The overall power of the system is better controlled.

First adjustment unit 203 and/or second adjustment unit 204 is/are configured to adjust the power of the first carrier signal and/or the second carrier signal, respectively, depending on a maximum allowable power imbalance between the power of the first carrier signal and the power of the second carrier signal. To a certain extent the complete separation between the first and the second adjustment units is canceled, they depend on each other via the maximum allowable power imbalance. By modifying the power adjustment, the problem of in-band emission is mitigated.

Although FIG. 2 as well as the following FIGS. 3-6 are limited to a first carrier frequency and a second carrier frequency it is to be understood that the user equipment may be configured to transmit on more than two different carrier frequencies. In this case the number of adjustment units may be equal to the number of carrier frequencies. The limitation to two frequencies is only for the sake of simplicity and not limiting in any way.

Figure 3:
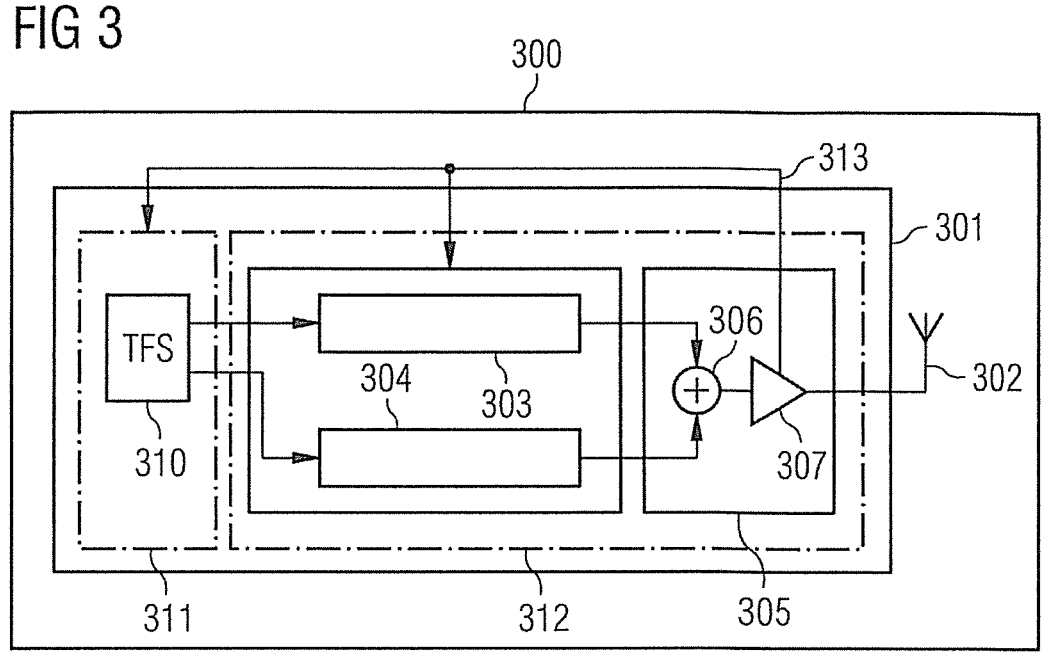
FIG. 3 schematically illustrates a user equipment 300 comprising a transport format selector.

FIG. 3 shows a user equipment 300 comprising an antenna 302. User equipment 300 comprises a device for controlling a transmit power 301 which is connected to the antenna 302. The device 301 comprises a radio frequency front-end 305. The radio frequency front-end 305 includes a power amplifier 307 and an adder 306. User equipment 300 further comprises a first adjustment unit 303 and a second adjustment unit 304 configured to adjust the power of a first carrier signal or first carrier frequency and a second carrier signal, respectively. The device for controlling a transmit power 301 further comprises a transport format selector (TFS) 310. The transport format selector 310, also called a transport format combination selector 310, is connected to the first adjustment unit 303 and the second adjustment unit 304. The transport format selector 310 is comprised in the media access control layer indicated by a dashed line 311 in one embodiment. Adjustment units 303 and 304 as well as the radio frequency front-end 305 are comprised in the physical layer 312 indicated by another dashed line in one embodiment. User equipment 300 in general or device 301 more precisely may further comprise a feedback loop 313 from power amplifier 307 back to the MAC layer for feeding back information concerning an allowable power imbalance.

In modern communications networks, voice connections, which can have relatively lower transmission rates than data connections, can exist simultaneously with one or more data transmissions. Mobile wireless communication devices can select a transport format combination that can include a mixture of voice packets and data packets from multiple simultaneous connections between the mobile wireless communication device and the network or the base station. With the transport format combination selection the data throughput is modulated.

Transport format (combination) selector 310 takes into account the maximum allowable power imbalance. In other words, a transport format selection effectuated by selector 310 accounts not only for transmit power levels but also for transmit power imbalances. Thus, transport format selection is not only effectuated in order to avoid exceeding a maximum overall transmit power but also to avoid exceeding a maximum permitted carrier power imbalance. Transport format combination selection in the user equipment may be, for example, continuously evaluated based on elimination, recovery and blocking criteria. In more general terms the transport format combination selection in the user equipment may be done by evaluating the available power headroom to determine what transport formats are supported within this headroom. This approach allows reacting as fast as possible on changes of the channel attenuation, faster than it is possible with the low pass filtering realized by rules like elimination, recovery and blocking criteria. Different algorithms may be used to take into account a maximum overall transmit power as well as a maximum permitted carrier power imbalance. Iterative approaches are possible as well as direct computation. It is also possible to implement a look up table with values indicating settings which ascertain not to exceed the maximum allowable power imbalance. The user equipment may estimate a transmit power for a given transport format combination (TFC). The user equipment may further estimate the power imbalance for the given TFC and change the TFC when the maximum power or/and the maximum power imbalance is exceeded.

Figure 4:
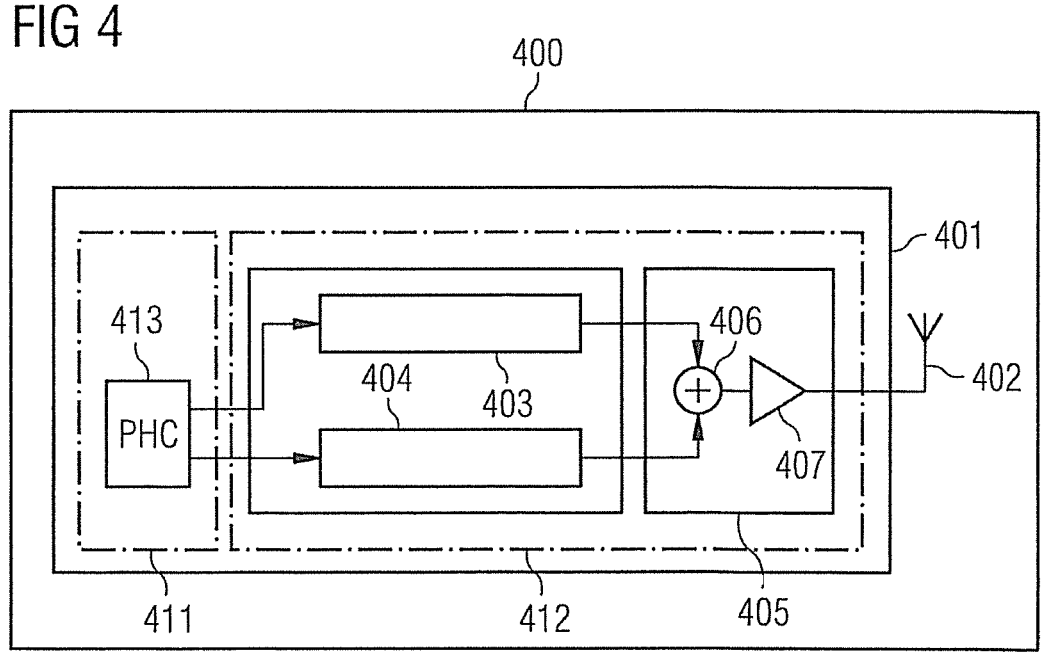
FIG. 4 schematically illustrates a user equipment 400 comprising a power headroom calculator.

FIG. 4 shows a user equipment 400. User equipment 400 comprises an antenna 402 and a device for controlling a transmit power 401. The device 401 comprises in a physical layer 412 a radio frequency front-end 405 with a power amplifier 407 and an adder 406. Similarly to user equipments 200 and 300, the user equipment 400 further comprises in the physical layer 412 a first adjustment unit 403 and a second adjustment unit 404. User equipment 400 comprises in a medium access control layer 411 a power headroom calculator (PHC) 413. The power headroom calculator 413 evaluates the remaining transmit power for TFC selection and can also provide a first transmit power distribution to the active carriers, i.e. to the first carrier signal and the second carrier signal. The power headroom calculator 413 is configured to calculate a power headroom for the first carrier signal which passes the first adjustment unit 403 and for the second carrier signal passing the second adjustment unit 404. The power headroom calculation effectuated in the power headroom calculator 413 depends on the maximum allowable imbalance between the power of the first carrier signal and the power of the second carrier signal.

Figure 5:
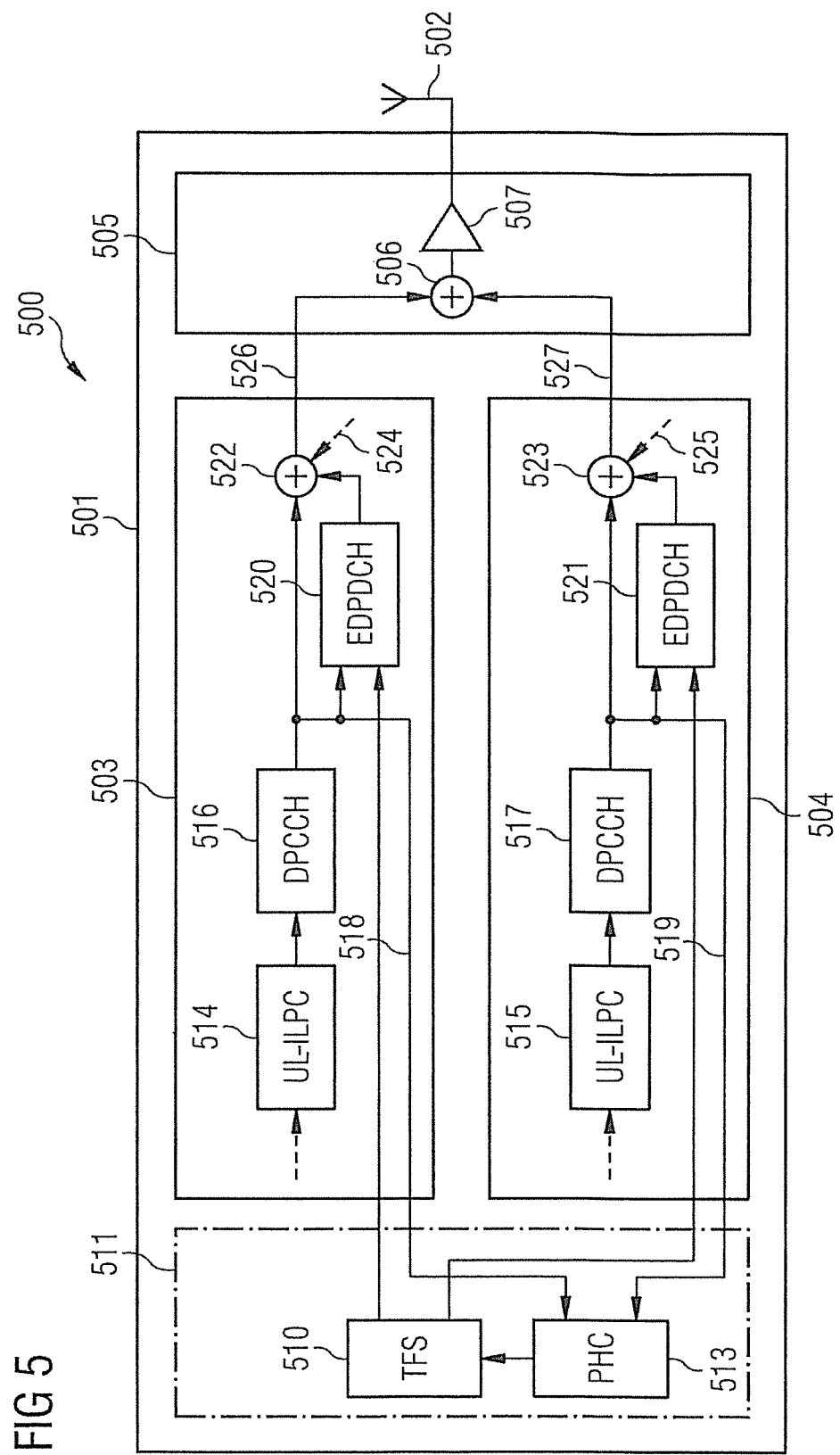
FIG. 5 schematically illustrates a user equipment 500 comprising DPCCH and E-DPDCH power calculation units.

FIG. 5 shows a user equipment 500 comprising a device for controlling a transmit power 501 and an antenna 502 coupled to the device 501. A radio frequency front-end 505 comprises an adder 506 and a power amplifier 507 coupled with an input to adder 506. User equipment 500 transmits as the previously described user equipments in an uplink channel a signal comprising two carrier signals with two different carrier frequencies. A first carrier signal may have a first frequency f1 and a bandwidth Δf1 of 5 MHz. A second carrier signal may have a carrier frequency f2 and a bandwidth Δf2 of 5 MHz. The frequencies f1 and f2 are distant of 5 MHz so that the two frequencies bands are adjacent to each other. Power amplifier 507 is configured to amplify a signal having a bandwidth of 10 MHz.

A first adjustment unit 503 is configured to adjust the power of the first carrier signal. A second adjustment unit 504 is configured to adjust the power of the second carrier signal. The device 501 further comprises in a MAC layer 511 a transport format combination selector (TFS) 510 and a power headroom calculator (PHC) 513. A transmit power of each carrier is determined in the following way. First a fast uplink inner loop power control (UL/ILPC) 514 is used for the first carrier signal and a UL/ILPC 515 is used for the second carrier signal. Both inner loop power controls 514 and 515 are realized in the physical layer. They are intended to compensate for the attenuation caused by the mobile radio channel. A base station, for example BS1 as shown in FIG. 1, transmits power control commands in the associated downlink channel to user equipment 500 in order to adjust the transmit power of a dedicated physical control channel (DPCCH). By the control commands the base station tries to maintain a signal-to-noise-power ratio (SNR) at the base station side that allows a certain quality of service (QOS). In the user equipment 500 the transmit power levels of all other active physical channels, like the enhanced dedicated physical data channel (E-DPDCH), are determined relative to the DPCCH power level. This relation is provided by network settings and the instantaneous data throughput carried by the physical channel. In DC-HSUPA the instantaneous data throughput of each carrier is determined centrally by the medium access control layer. The data throughputs of the two carriers are generally independent of each other, for example, by independent scheduling grants. The MAC layer 511 is informed by the physical layer of the transmit power level of each DPCCH to know about the transmit power headroom that can be used for E-DPCCH transmission to not exceed the maximum transmit power supported by the radio frequency front-end. The DPCCH power level is calculated in a calculation unit 516 for the first carrier signal and in a calculation unit 517 for the second carrier signal. Lines 518 and 519 indicate a feedback from calculation units 516 and 517 concerning the DPCCH power level to the power headroom calculator 513.

The power headroom calculator 513 forwards calculation results to transport format selector 510. Transport format combination selector 510 transmits commands to a E-DPDCH power calculation unit 520 for the first carrier signal and a E-DPDCH power calculation unit 521 for the second carrier signal. Calculation units 520 and 521 also receive information from the DPCCH calculation units 516 and 517, respectively. The transmit power of each uplink carrier, i.e. for the first carrier signal and the second carrier signal is calculated by adding all its active physical channels as indicated by an adder 522 for the first carrier and an adder 523 for the second carrier. An arrow 524 for the first carrier and an arrow 525 for the second carrier indicate that there may be other active physical channels than the channels DPCCH and E-DPDCH indicated in FIG. 5. The sum of the channel powers of the two carriers is applied to the radio frequency front-end 505 as indicated by arrows 526 and 527.

Of course, user equipment 500 comprises further components. For example, no IQ data processing nor the mixing process of the two carrier IQ data streams are shown. They are not important for understanding power imbalance control and therefore omitted.

As explained above in detail, user equipment 500 comprises four independent power calculation units. These are DPCCH power calculation unit 516, E-DPDCH power calculation unit 520, DPCCH power calculation unit 517 and E-DPDCH power calculation unit 521. Furthermore, transmit power is influenced by the power headroom calculation unit 513 and by the transport format selector 510. At least one of the units 510, 513, 516, 517, 520 and 521 is configured to control the transmit power taking into account an allowable power imbalance between the power level of the first carrier signal and the power level of the second carrier. For example, one or more look up tables may be implemented in one or more of the units 510, 513, 516, 517, 520 and 521 with values indicating settings which ascertain not to exceed the maximum allowable power imbalance. The look up tables can for example introduce different maximum allowable power imbalance values for different carrier spacing, or for different coding and modulation schemes used for the involved carriers, or for different quality of service settings provided to the higher layers.

Of course, more than one calculation unit may take into account the maximum allowable power imbalance. It is to be reminded that power imbalance may cause in-band emission. The E-DPDCH power calculation may be modified to take into account the supported power imbalance. Furthermore, the DPCCH power calculation may be modified to take into account the supported power imbalance. Furthermore, the transport format selection in the MAC layer may be modified to take into account the supported power imbalance. For example, if the user equipment transmit power imbalance exceeds the maximum supported value, the user equipment 500 shall start by reducing all the E-DPDCH gain factors on the carrier signal with highest power level by an equal scaling factor to respective reduced gain factor values so that the transmit power imbalance would be equal to the maximum supported value.

Optionally, if the user equipment transmit power imbalance would exceed the maximum supported imbalance value after reducing all the E-DPDCH gain factors for all activated uplink frequencies, the user equipment shall increase the transmit power of the carrier signal with lowest power level so that the transmit power imbalance would be equal to the maximum supported value. This is done by additional scaling for that particular carrier such that the power ratio between DPCCH and HS-DPCCH and between DPCCH and E-DPCCH and between DPCCH and E-DPDCH remains the same. Additional scaling means that all channels are attenuated by an equal factor. Thus the power or gain ratios between these channels remain unchanged.

Figure 6:
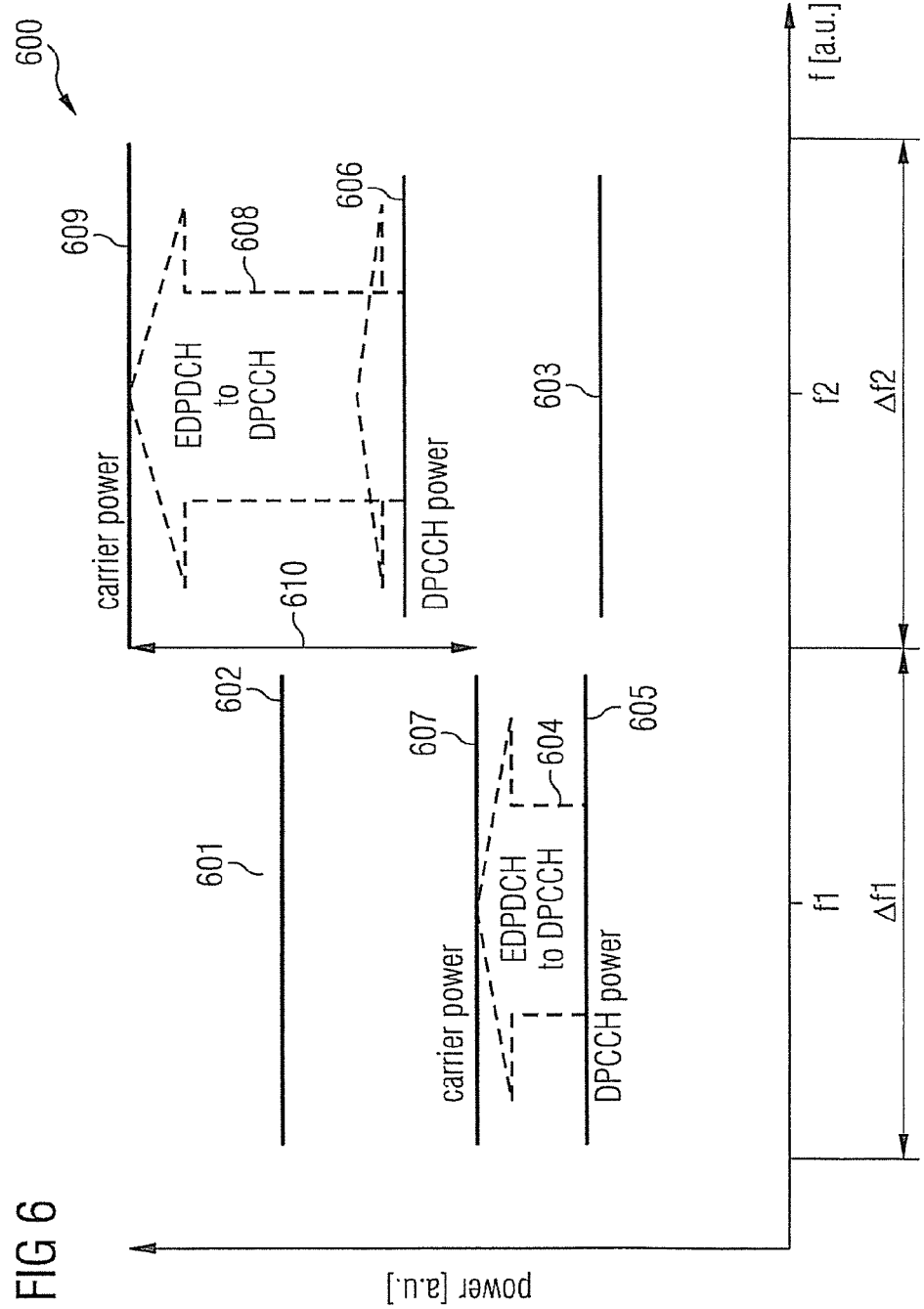
FIG. 6 illustrates in a diagram different power levels comprised in an uplink channel.

FIG. 6 shows a diagram 600 having two axis, an x-axis and a y-axis. A power level is plotted in arbitrary units along the y-axis against a frequency f, also in arbitrary units, along the x-axis. A dashed line 601 shows a possible frequency selectivity for a mobile radio channel. This may be an uplink channel UL, for example between the user equipment UE1 and base station BS1 of FIG. 1, wherein the user equipment UE1 may be realized according to any of user equipments 200 to 500.

A first carrier may have a frequency f1 and a second carrier may have a frequency f2. The first carrier has a bandwidth Δf1 which may be 5 MHz and the second carrier has a bandwidth Δf2 which may also be 5 MHz. The frequency bands are adjacent to each other. Thus, diagram 600 shows on the left power levels for the first carrier and on the right power levels for the second carrier. A power amplifier included in a user equipment shall be configured to amplify over the whole band Δf1 plus Δf2. According to the frequency selectivity of the actual physical radio channel, the first carrier has an average channel power 602 which is relatively high. On the other hand, the second carrier has an average channel power 603 which is relatively low. The average multi-path channel attenuation of the first carrier is low while the second carrier has high average multi-path channel attenuation.

The base station or more general the network gives a certain first scheduling grant to the first carrier resulting in a certain data throughput allocation and a certain E-DPDCH to DPCCH power ratio which is indicated by a dashed arrow 604. The base station or more general the network gives a certain second scheduling grant to the second carrier resulting in a certain data throughput allocation and a certain E-DPDCH to DPCCH power ratio which is indicated by a dashed arrow 608.

The base station measures the signal-to-noise ratio. For the first carrier, which is on a strong channel, the signal-to-noise ratio will be good and, consequently, the DPCCH power will be set by the base station to a rather low value as depicted in FIG. 6 by a line 605 for the DPCCH power of the first carrier. On the other hand, the average channel power for the second carrier is low. Thus, the base station will measure a bad signal-to-noise ratio and set the DPCCH power to a level 606 which is higher than the level 605.

In the standards from 3GPP everything is related back to the value of DPCCH. Independently, the base station gives a certain scheduling grant to the first carrier and the second carrier. As this data throughput allocation is independent from the multi-path channel attenuation and the setting of the DPCCH, it may happen that the base station allocates a smaller E-DPDCH to DPCCH ratio 604 to the first carrier resulting in a carrier power 607 and a higher scheduling grant is given to the second carrier, which leads to a higher data throughput, and an E-DPDCH to DPCCH power ratio 608 which is much higher than the E-DPDCH to DPCCH ratio 604. This results in a carrier power 609. A difference 610 between carrier power 607 of the first carrier and carrier power 609 of the second carrier is the power imbalance. In the example shown in FIG. 6, the power imbalance is very high and exceeds an allowable power imbalance.

The power levels indicated in diagram 600 may be changed to reduce the power imbalance 610 in several ways. For example the E-DPDCH power of the second carrier may be reduced. This can either be done by using a modified transport format selection in the MAC layer by selector 510 in FIG. 5. Alternatively, this may be done by a modified E-DPDCH power calculation in the calculation unit 521 of FIG. 5 in the physical layer. By modifying the transport format selection, a data throughput is limited or in more general terms influenced. It is also possible to reduce the carrier power 609 by a changed DPCCH calculation in unit 517 (FIG. 5) leading to a reduced DPCCH power 606. Then, without changing the E-DPDCH 608 the carrier power 609 would be reduced. Another possibility is to increase carrier power 607 of the first carrier signal. This is only possible if the overall power, which is the sum of carrier powers 607 and 609, and which is fed into power amplifier 507, does not exceed the maximum allowable power. Then, by changing the calculation of DPCCH in unit 516 or by changing the calculation of the E-DPDCH in unit 520, the carrier power 607 may be increased. The carrier power 607 may also be increased by a changed transport format selection in selector 510 or an configured power headroom calculation in unit 513.

What is important is that the user equipment is aware of a limited allowable power imbalance and takes the allowable power imbalance into account when calculating the carrier power of the first and/or the second carrier. The maximum allowable power imbalance may be a fixed value. The allowable power imbalance may depend on the power amplifier 507 used. The radio front-end in general, or the power amplifier, may detect a current power imbalance headroom. A user equipment may comprise a feedback loop 313, as indicated in FIG. 3, to feed back the current allowable power imbalance headroom to the physical layer or to the MAC layer or to both of them.

Figure 7:
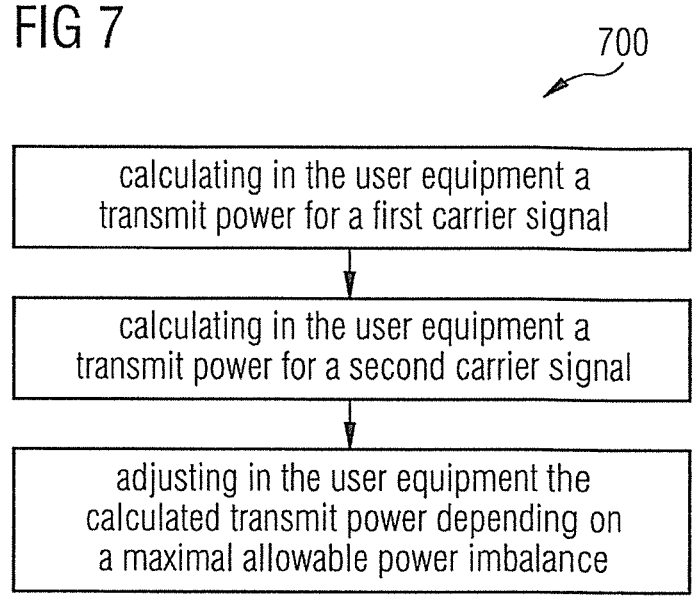
FIG. 7 schematically illustrates a method 700.

FIG. 7 illustrates a method for controlling a transmit power in a user equipment of a radio communications system. The user equipment uses a multi-carrier technique. In the present example it uses two carriers. In the user equipment a transmit power for a first carrier signal is calculated. Further, in the user equipment a transmit power for a second carrier signal is calculated. The calculated transmit power is adjusted in the user equipment depending on a maximum allowable power imbalance. Power adjusting may be effectuated, for example, by limiting a data throughput applied to the one carrier signal out of the two carrier signals, which has the higher power for a dedicated physical control channel. It may be effectuated by limiting a data throughput applied to the signal which has the lower power headroom. Another way would be to calculate a power headroom in a medium access layer depending on the maximum allowable power imbalance.

The maximum allowable power imbalance may also be taken into account in the physical layer. A power level of the one carrier out of the two carriers which has a higher power level may be reduced. Or, if the maximum power level allows, the power level of the lower power signal may be increased in the physical layer. Another way is to reduce a power ratio of a power level of an enhanced dedicated physical data channel (EDPDCH) to a power level of a dedicated physical control channel (DPCCH) for the carrier signal out of the first and the second carrier which has a lower power headroom. Still another way is to reduce the power ratio for the signal, which has a higher dedicated physical control channel power level. Still another possibility is to reduce a power ratio for power level of an enhanced dedicated physical data channel to a power level of a dedicated physical control channel for the carrier signal out of the first carrier signal and the second carrier signal, which has a higher power level.

It is to be understood that all these different methods may be combined.

While the invention has been illustrated and described with respect to one or more implementations, alterations and/or modifications may be made to the illustrated examples without departing from the spirit and scope of the appended claims. In particular, with regard to the various functions performed by the above described components or structures, the terms used to describe such components are intended to correspond, unless otherwise indicated, to any component or structure which performs the specified function of the described component (e.g. that is functionally equivalent), even though not structurally equivalent to the disclosed structure which performs the function in the herein illustrated exemplary implementations of invention.

What is claimed is:

1. A device for controlling a transmit power, comprising:
 a first adjustment unit configured to adjust a power of a first carrier signal;
 a second adjustment unit configured to adjust a power of a second carrier signal;
 wherein the first adjustment unit is configured to adjust the power of the first carrier signal based on a maximum allowable imbalance between the power of the first carrier signal and the power of the second carrier signal; and
 at least one of:
  a transport format selector configured to select a transport format that comprises a mixture of voice packets and data packets for a first carrier signal having a first carrier signal power and for a second carrier signal having a second carrier signal power; wherein the transport format selection depends on the maximum allowable power imbalance between the first carrier signal power and the second carrier signal power; and
  a power headroom calculator configured to calculate a power headroom for a first carrier signal having a first carrier signal power and a power headroom for a second carrier signal having a second carrier signal power; wherein the power headroom calculation depends on a maximum allowable power imbalance between the first carrier signal power and the second carrier signal power.

2. The device of claim 1, wherein the first adjustment unit comprises:
 a power calculator configured to calculate a power for a dedicated physical control channel (DPCCH) for at least one of the first carrier signal and the second carrier signal based on the maximum allowable imbalance between the power of the first carrier signal and the power of the second carrier signal.

3. The device of claim 1, wherein the first adjustment unit comprises:
 a power calculator configured to calculate a power for an enhanced dedicated physical data channel (E-DPDCH) for at least one of the first carrier signal and the second carrier signal based on the maximum allowable imbalance between the power of the first carrier signal and the power of the second carrier signal.

4. The device of claim 1, further comprising:
 a power amplifier configured to amplify the first carrier signal and the second carrier signal, wherein the power amplifier is configured to signal the maximum allowable power imbalance.

5. The device of claim 1, wherein the first adjustment unit and the second adjustment unit are in a physical layer.

6. A device for controlling a transmit power, comprising:
 a transport format selector configured to select a transport format that comprises a mixture of voice packets and data packets for a first carrier signal having a first carrier signal power and for a second carrier signal having a second carrier signal power;
 wherein the transport format selection depends on a maximum allowable power imbalance between the first carrier signal power and the second carrier signal power.

7. A device for controlling a transmit power, comprising:
a power headroom calculator configured to calculate a power headroom for a first carrier signal having a first carrier signal power and a power headroom for a second carrier signal having a second carrier signal power; wherein the power headroom calculation depends on a maximum allowable power imbalance between the first carrier signal power and the second carrier signal power.

8. A method for controlling a transmit power in a user equipment of a radio communications system; comprising:
calculating in the user equipment a transmit power for a first carrier signal;
calculating in the user equipment a transmit power for a second carrier signal;
adjusting in the user equipment the calculated transmit power for at least one out of the first carrier signal and the second carrier signal based on a maximum allowable power imbalance between the first carrier signal transmit power and the second carrier signal transmit power; and
performing at least one of:
limiting a data throughput applied to one of the first carrier signal and the second carrier signal having a lower power headroom; and
calculating a power headroom in a medium access layer based on a maximum allowable power imbalance.

9. The method of claim 8, comprising:
limiting a data throughput applied to one of the first carrier signal and the second carrier signal having a higher transmit power for a dedicated physical control channel.

10. The method of claim 8, comprising:
reducing in a physical layer a power level of one of the first carrier signal and the second carrier signal having a higher transmit power.

11. The method of claim 8, comprising:
increasing in the physical layer a power level of one of the first carrier signal and the second carrier signal having a lower transmit power level.

12. The method of claim 8, comprising:
reducing a power ratio of a power level of an enhanced dedicated physical data channel to a power level of a dedicated physical control channel for one of the first carrier signal and the second carrier signal having a lower power headroom.

13. The method of claim 8, comprising:
reducing a power ratio of a power level of an enhanced dedicated physical data channel to a power level of a dedicated physical control channel for one of the first carrier signal and the second carrier signal having a higher dedicated physical control channel power level.

14. The method of claim 8, comprising:
reducing a power ratio of a power levl of an enhanced dedicated physical data channel to a power level of a dedicated physical control channel for one of the first carrier signal and the second carrier signal having a higher transmit power level.

15. The method of claim 8, wherein a medium access layer or a physical layer of the user equipment comprises a look up table with values indicating settings which indicate the maximum allowable power imbalance.

16. The method of claim 8, further comprising:
detecting a current power imbalance headroom at a radio-frequency front-end of the user equipment; and
feeding back the detected power imbalance headroom to one of a medium access layer and a physical layer of the user equipment.

* * * * *